(12) United States Patent
Morgan

(10) Patent No.: US 6,721,948 B1
(45) Date of Patent: Apr. 13, 2004

(54) METHOD FOR MANAGING SHARED TASKS IN A MULTI-TASKING DATA PROCESSING SYSTEM

(75) Inventor: William E. Morgan, Seattle, WA (US)

(73) Assignee: Equator Technologies, Inc., Campbell, CA (US)

( * ) Notice: Subject to any disclaimer, the term of this patent is extended or adjusted under 35 U.S.C. 154(b) by 652 days.

(21) Appl. No.: 09/608,887

(22) Filed: Jun. 30, 2000

(51) Int. Cl.$^7$ ................................................ G06R 9/00
(52) U.S. Cl. ...................... 718/102; 718/100; 718/104; 718/105
(58) Field of Search ................................ 709/100, 101, 709/102, 103, 104, 107; 718/100, 101, 102, 103, 104, 105, 106, 107

(56) References Cited

U.S. PATENT DOCUMENTS

| 4,414,624 A | * | 11/1983 | Summer, Jr. et al. | 712/21 |
| 5,179,702 A | * | 1/1993 | Spix | 709/102 |
| 5,838,968 A | * | 11/1998 | Culbert | 709/104 |
| 5,978,829 A | * | 11/1999 | Chung | 244/141 |
| 6,505,229 B1 | * | 1/2003 | Turner et al. | 709/107 |
| 6,567,840 B1 | * | 5/2003 | Binns et al. | 709/103 |

* cited by examiner

Primary Examiner—Majid A. Banankhah
(74) Attorney, Agent, or Firm—Jeffrey Van Myers

(57) ABSTRACT

A method for managing tasks in a data processing system having a shared task, which may be performed in hardware, software, or a combination of both. In response to a request from a requesting task, the task manager of the data processing system initiates performance of the shared task on behalf of the requesting task. At selected points in the performance of the shared task, the requesting task may cooperate with the shared task to selectively store watchpoints, each comprising sufficient information about the then-current status of the shared task to allow resumption of that task. During the performance of the shared task, the requesting task can determine if the shared task is still performing that task on behalf of the requesting task. If the requesting task determines that the task manager has interrupted the performance of the shared task on behalf of the requesting task prior to completion thereof, the requesting task may thereafter request the task manager to reinitiate performance of the shared task at the most recently stored watchpoint.

12 Claims, 5 Drawing Sheets

-- Prior Art Case I --

-- Prior Art Case II --

METHOD FOR MANAGING SHARED TASKS IN A MULTI-TASKING DATA PROCESSING SYSTEM

BACKGROUND OF THE INVENTION

1. Technical Field

The present invention relates to task management in a data processing system, and specifically to allocation of a shared resource among multiple competing requests.

2. Background Art

In general, in the descriptions that follow, I will italicize the first occurrence of each special term of art which should be familiar to those skilled in the art of communication system security. In addition, when I first introduce a term that I believe to be new or that I will use in a context that I believe to be new, I will bold the term and then provide the definition that I intend to apply to that term. In addition, throughout this description, I will use the terms assert and negate when referring to the rendering of a signal, signal flag, status, bit or similar apparatus into its logically true or logically false state, respectively.

Within a data processing system, the various hardware resources are usually controlled by low-level software modules, sometimes called drivers. Basic system functions, on the other hand, such as file or memory management, are performed by mid-level software modules that, in turn, may rely upon one or more of the drivers for actual hardware support. System level functions, such as application and transaction management, are coordinated by upper-level software modules that may themselves rely upon one or more of the lower level modules for support. This hierarchy of system software modules is usually referred to as a operating system or OS. In general, an application program, such as a word processor or a browser, is comprised of one or more high-level modules which may, in the course of their execution, invoke either other application modules or OS modules, as needed, to perform specific functions.

The general process of module invocation and termination, usually referred to as task management, is coordinated by specific operating system modules, collectively referred to as the Task Manager or TM. From the perspective of the TM, a task can be any software module, system or application, that performs a designated function and has regular structured input and regular structured output. For example, so long as an executing module (a requesting task) can construct the appropriate request to the TM to initiate a particular task (a requested task), the requesting task doesn't care whether the requested task accomplishes that request entirely in software, entirely in hardware, or in a combination of software and hardware. From the perspective of the requesting task, therefore, all lower level support tasks, whether software, hardware or both, can be considered as resources. Task management is thus just a particular form of resource management.

In multi-tasking data processing systems, multiple processes can be active simultaneously, although in a single processor system, only one of the active processes will be in control of the processor at any point in time. By way of example, assume that, at a particular point in time, a Process_A is in control of the processor, and, in particular, that a Task_X of Process_A has just issued a request to the TM that Task_R be performed. Assume also that, since Task_R will take a relatively significant time to complete and that Task_X cannot proceed until Task_R is completed, the TM will take control of the processor away from Task_X of Process_A and give it to, perhaps, a Task_S of a Process_B. Finally, assume that, before Task_R completes the request from Task_X of Process_A, Task_S also requests that Task_R be performed. If, due to the nature of Task_R only one instant can be active at a particular point in time, then a resource conflict has occurred. A typical example is where Task_R "owns" exclusive rights to exploit a unique hardware or software component of the system. Access to Task_R must therefore be shared. This shared resource allocation problem can be further complicated if, for any of a number of valid reasons, each process (or each task within each process) is assigned a relative priority: what is to happen, for example, if Process_B has been assigned a higher priority than Process_A?

FIG. 1 illustrates a conventional data processing system 2 having a central processing unit or CPU 4 coupled to multiple special function units or SFUs, via a communication bus 6. Any of a variety of functions may be implemented by SFU1 8 and SFU2 10, including arithmetic functions, logical functions, multimedia functions, etc. Each of SFU1 8 and SFU2 10 may perform a single function, or may perform multiple functions. Additionally, the data processing system 2 includes a resource 12, which may be another processor, a memory, or any other device accessed by data processing system 2. Within a memory 14 is located an OS 16, and at least one application program 18. Each application program 18 includes a scheduling block, and multiple tasks, such as Task_1 and Task_2. Depending upon various system resource constraints and workload demands, additional application programs (not shown) may be simultaneously active in the memory 14.

Various operating scenarios of the data processing system 2, according to the prior art, are illustrated in FIGS. 2–4. In Case I, illustrated in FIG. 2, OS 16 initiates a Process_A ("Start_A"), which may be either an application or system module. During execution, Process_A makes a request to the OS ("A_Request_R") for use of a shared resource, R, such as a particular shared task resident in the memory 14 or perhaps the resource 12. At this time, OS 16 initiates operation of the shared resource R ("A_Start_R"), which proceeds to perform its designated function. Upon initiating R, OS 16 stores information to identify Process_A as the current process utilizing resource R. While R is running, Process_A may perform other operations until some result or response from R is required ("A_Read_R"). If R is not yet completed, Process_A must wait (indicated in FIG. 2 by the dashed vertical time line). Upon completion, R sends a response to the waiting Process_A ("R_Response_A"), and Process_A is then able to continue. Simultaneously, R notifies OS 16 ("R_Stop_A") that it has completed Process_A's request. When Process_A finally completes its operation, it notifies the OS 16 ("A_Stop").

FIG. 3 illustrates another prior art scenario, Case II, that is similar to Case I, except that a Process_B is initiated ("Start_B") after Process_A has been initiated ("Start_A"). During execution, Process_B also makes a request to OS 16 ("B_Request_R") for the use of resource R. At the time of this request, R is still performing the request from Process_A. If OS 16 has no mechanism for resolving the conflict or if both Process_A and Process_B have the same or lower priority, Process_B must wait until R completes Process_A's request. Once R notifies OS 16 ("R_Stop_A") that it has completed the request of Process_A, OS 16 promptly initiates R for Process_B ("B_Start_R"). When resource R completes Process_B's request, it sends a response to the waiting Process_B ("R_Response_B"), which may now continue. Simultaneously, R notifies OS 16

("R_Stop_B") that it has completed Process_B's request. For simplicity, the ultimate completions of Process_A and Process_B have not been shown.

FIG. 4 illustrates still another prior art scenario, Case III, in which Process_B has been assigned a higher priority than Process_A. In this case, when Process_B requests R ("B_Request_R"), OS 16 immediately initiates R for Process_B ("B_Start_R"), thereby interrupting the operation of R for Process_A. When R completes, it sends a response to Process_B ("R_Response_B"), and, simultaneously, notifies OS 16 ("R_Stop_B") that Process_B's request is complete. At that time, OS 16 reinitiates R for Process_A (the second "A_Start_R").

As can be readily seen, the Case III allocation policy may result in significant loss in system performance, due to the wasted time spent by R servicing the interrupted request of Process_A. In pathological cases, the Process_A request may never be completed due to continual interruptions by requests for R from higher priority processes. One prior art solution is to provide a mechanism for R (or perhaps the requesting Process_A or the OS itself) to periodically store into the memory 14 a status "snapshot" or watchpoint consisting of sufficient information to allow later resumption should an interrupt occur. Then, should R be interrupted to service a higher priority process, R can resume operation at the precise point at which the last watchpoint was taken. Thus, except in extreme circumstances, the interrupted process will eventually complete.

In some systems, particular processes may have predetermined time windows within which they must complete. If the TM allows no resource interruption and reallocation, such critical processes may miss their deadlines. For example, Process_B might be a repeating process that monitors an input within a predetermined period, such as looking for an incoming system status signal. Here Process_B has a brief window within which to catch the signal. If Process_A has initiated R, Process_B may not be able to satisfy its deadline if it is forced to wait until R has completed Process_A's request. Although the prior art watchpoint mechanism would allow Process_B to interrupt Process_A's use of R, it assumes that, prior to interruption, the watchpoint was indeed taken. Depending upon the size of the watchpoint and the frequency with which they are taken, significant system resources and performance may thus be unavailable for application to more useful activities.

One additional problem with prior art resource allocation mechanisms is that certain operations are inherently atomic and are simply not amenable to interruption/resumption. The higher priority requester may miss a deadline if it must wait until a particularly long-running operation reaches a point at which it can be safely interrupted. For example, in some serial communication systems, end-to-end synchronization must be maintained and therefore a transmission cannot be interrupted without loss of the entire transaction. Similarly, in a packetized transaction, used in many communication networks, the packet transmission must be restarted after interrupt rather than resuming from the point of interrupt. The resulting degradation in system performance can be significant.

In all of these cases, the TM is required to dynamically allocate and, perhaps, reallocate shared resources. Should a conflict occur, the TM must first decide whether to allow Process_A's use of the resource to continue to completion, or to interrupt it so that Process_B can use the resource. If the latter choice is made, then the TM must determine if there is a recent watchpoint which can be used to resume the interrupted process when the higher priority process has completed, or, if not, to simply restart the resource after the interruption. Usually, the choice is made at the time the OS is designed and cannot be changed to meet different system criteria. In order to make such decisions in a more effective manner, either the TM must have access to additional information regarding the nature of the requesting processes or the requesting processes themselves must be allowed to participate in the decision process.

There is need therefore for a method for allocating a shared resource which allows each process some level of participation in the allocation decision by the TM. Additionally, a need exists for a more flexible method of allocating a shared resource to meet the timing of all processes in the system.

BRIEF SUMMARY OF THE INVENTION

My invention comprises a task management method in which each requesting task is responsible for deciding on an appropriate course of action in the event the requested task is interrupted for any reason. Preferably, the requesting task is capable of periodically requesting (and saving) the then-current status of the requested task, and the requesting task is capable of providing, if requested, sufficient status information to allow an interrupted task to be resumed. At a minimum, the requested task must be able to inform the requesting task as to the identity of the requesting task to which the requested task is then currently allocated. Should the requesting task determine from such status information that the requested task has been reallocated by the task manager, the requesting task will invoke an exception handler to deal appropriately with the situation.

BRIEF DESCRIPTION OF THE SEVERAL VIEWS OF THE DRAWINGS

My invention may be more fully understood by a description of my invention in conjunction with the attached drawings in which.

Figure 1:
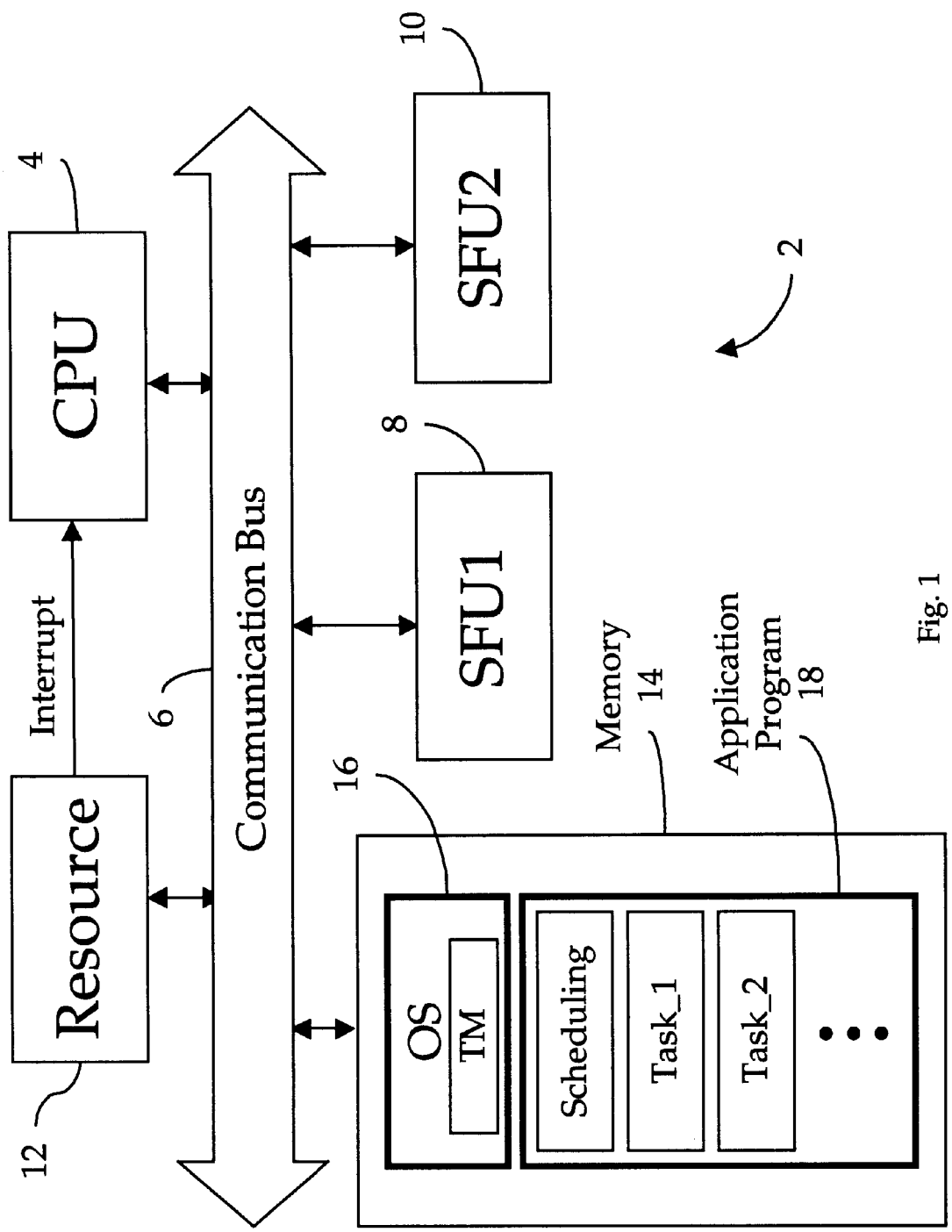
FIG. 1 illustrates in schematic diagram form a data processing system having a core processor, a shared resource and a memory storing an operating system.
Figure 2:
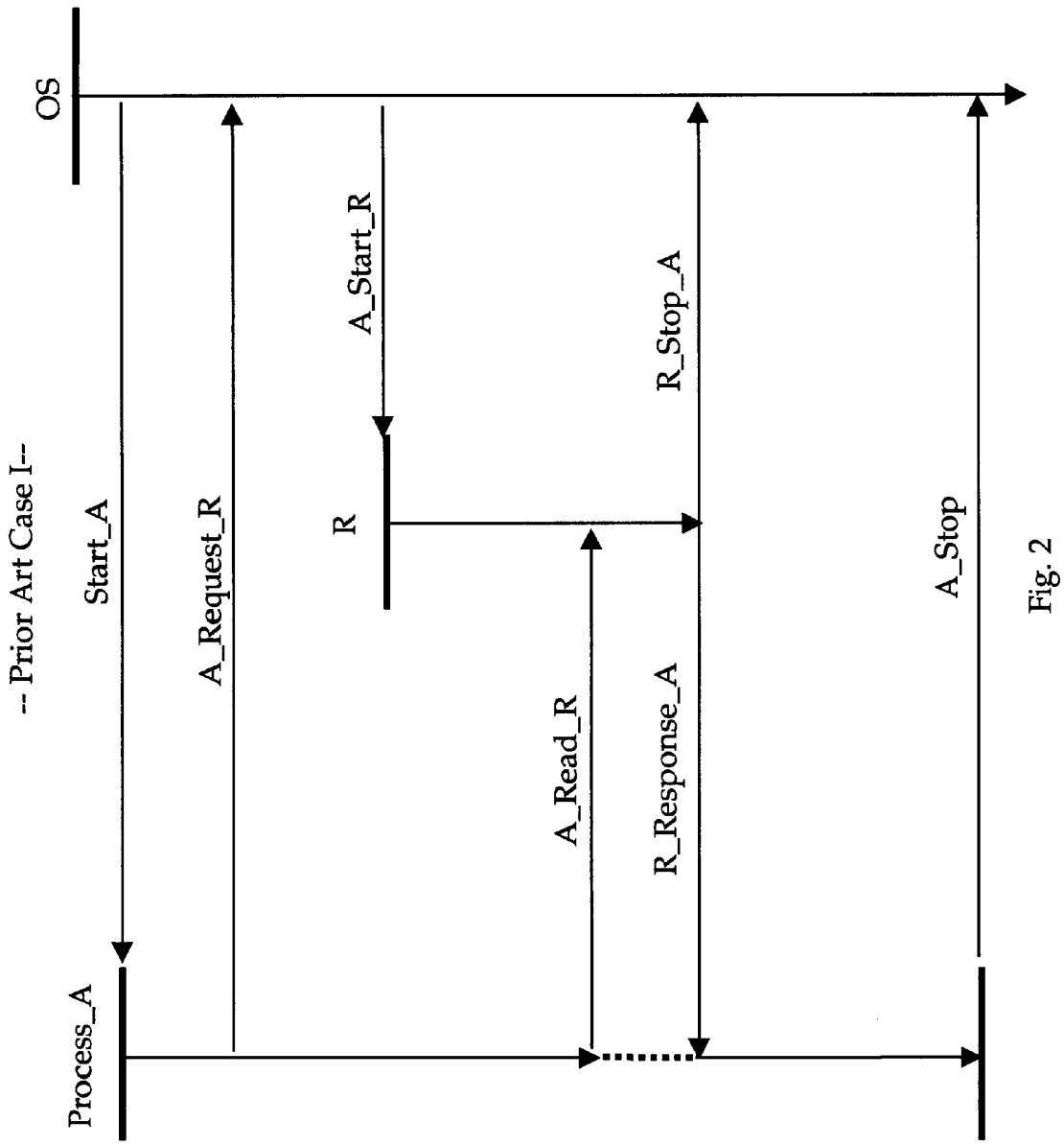
FIGS. 2–4 illustrate in time line form prior art operations of a data processing system as in FIG. 1, where the operating system controls access to a shared resource.
Figure 3:
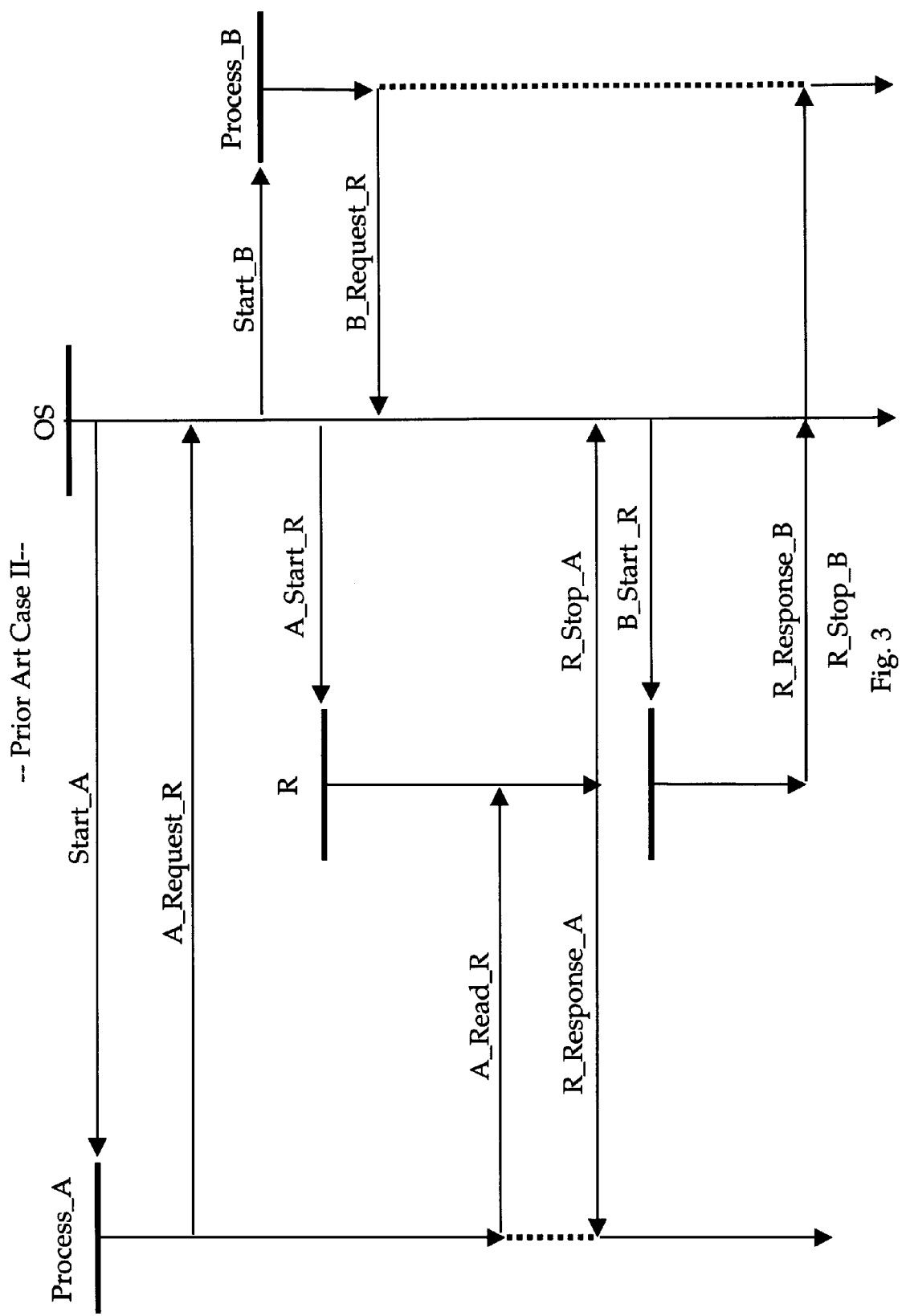
Figure 4:
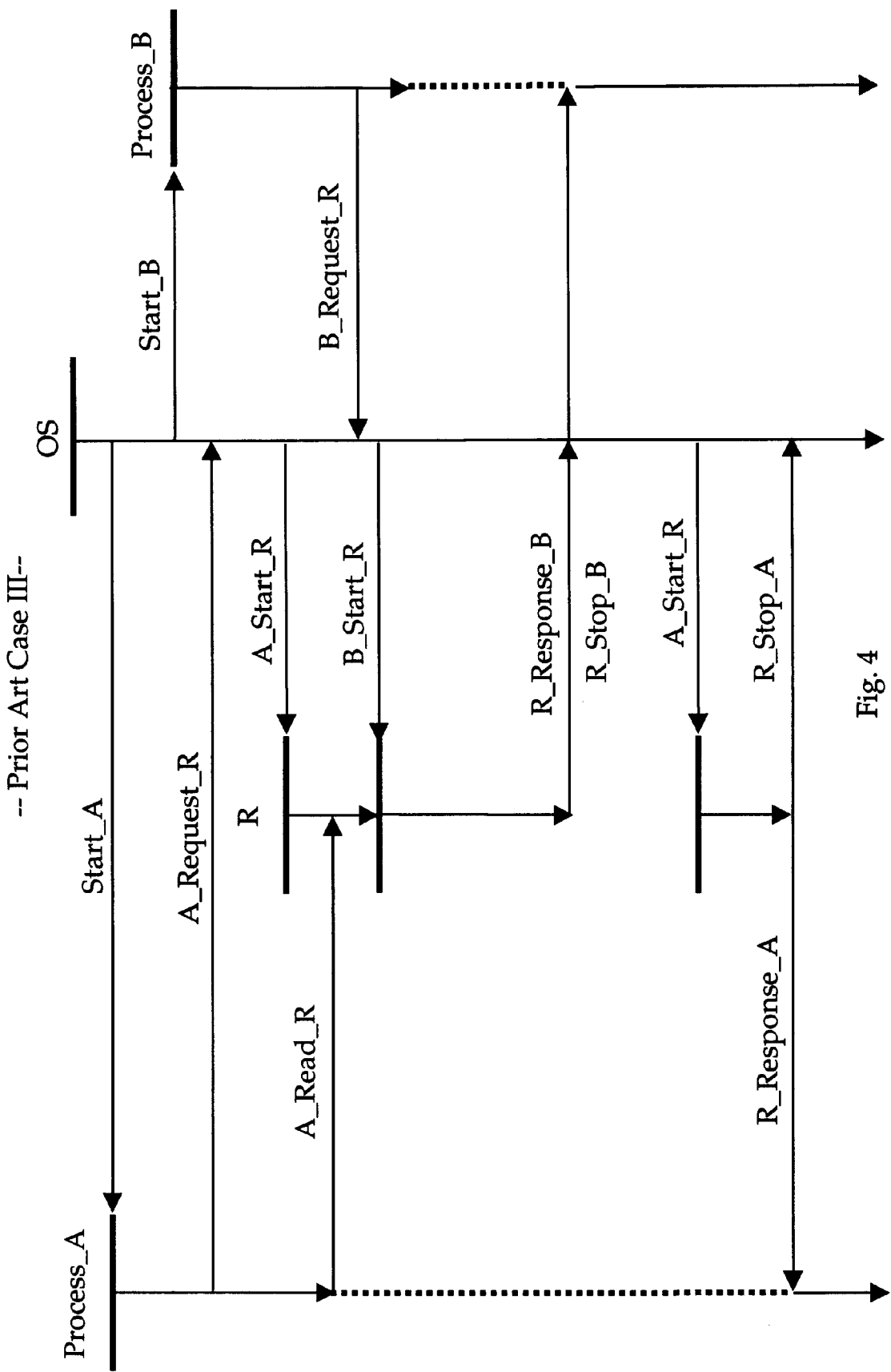

In the drawings, similar elements will be similarly numbered whenever possible. However, this practice is simply for convenience of reference and to avoid unnecessary proliferation of numbers, and is not intended to imply or suggest that my invention requires identity in either function or structure in the several embodiments.

DETAILED DESCRIPTION OF THE INVENTION

Figure 5:
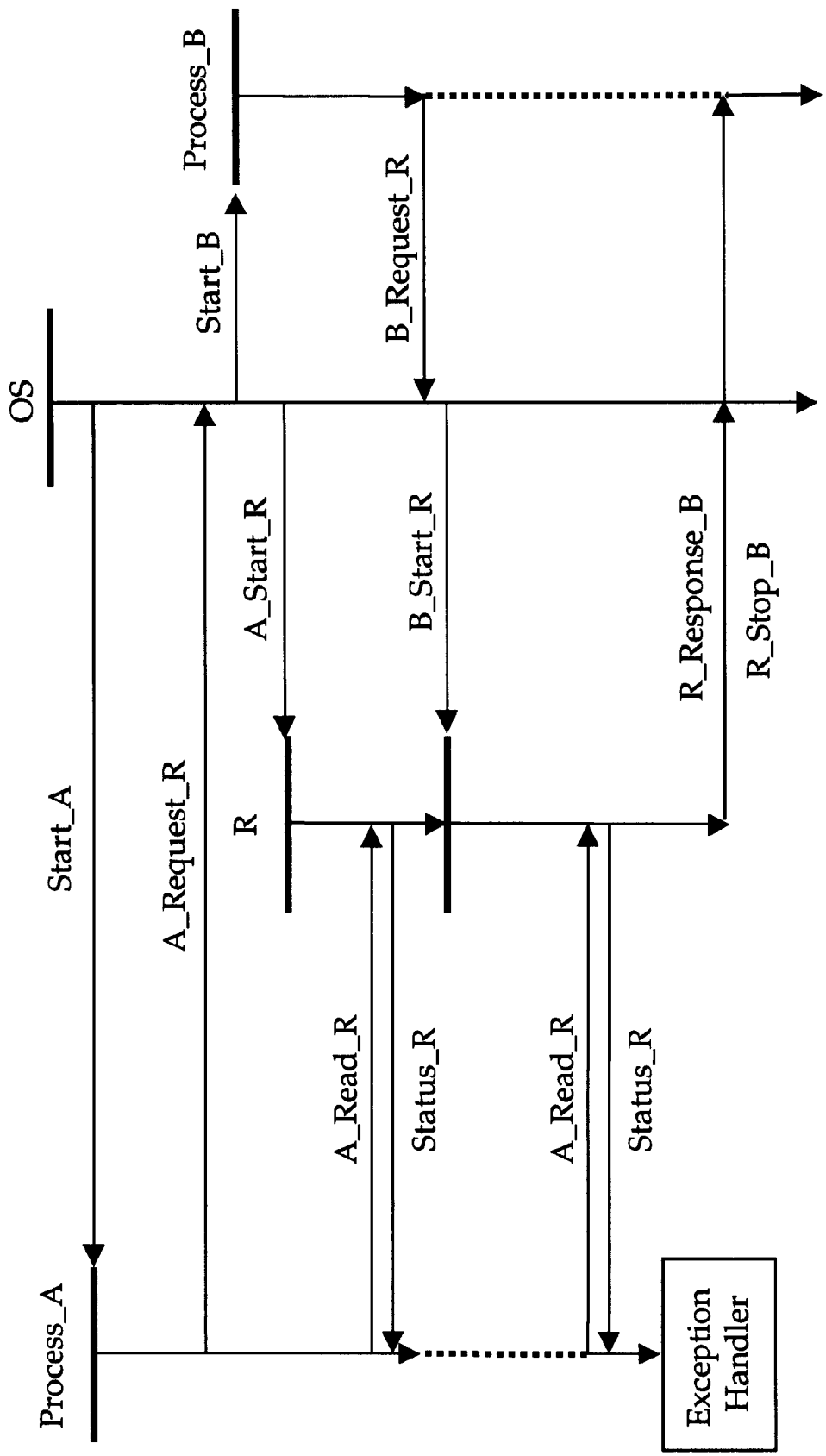
FIG. 5 illustrates in time line form the operation of a data processing system as in FIG. 1 according to a preferred embodiment of my invention.

FIG. 5 illustrates task management according to my invention. Initially, OS 16 initiates Process_A ("Start_A"). At some time thereafter, Process_A requests the use of R from OS 16 ("A_Request_R"), which thereupon initiates R ("A_Start_R"). A bit later in time, OS 16 initiates Process_B ("Start_B").

While resource R is still processing the request from Process_A, Process_A reads R (the first instant of "A_Read_R"), and, in response, R returns it's then-current status (the first instants of "Status_R"), including the ID of the requesting task to which R is allocated. At this point, this Task_ID verifies that R is allocated to Process_A. In addition, the status information may include sufficient state information to allow resumption of R in the event of reallocation prior to completion of Process_A's request. In such case, Process_A is responsible for saving such state information (or, at a minimum, providing to R a pointer to a storage area at which R can store the watchpoint). Preferably, the read request issued by Process_A to R will include a corresponding signal which can be optionally asserted by Process_A to request transfer to Process_A of the watchpoint. Thus, only those requesting tasks that anticipate possible interruption and resumption will require transfer of the full watchpoint, thereby reducing interprocess communications and improving system performance.

At a later point, Process_B requests use of R ("B_Request_R"). Assuming that OS 16 decides that Process_B is entitled to immediate use of R, OS 16 will initiate R for Process_B ("B_Start_R"). When R completes, it sends a response to Process_B ("R_Response_B"), and, simultaneously, notifies OS 16 ("R_Stop_B") that Process_B's request is complete.

In deciding whether or not to interrupt Process_A's use of R, OS 16 will need to take into consideration various conditions. For example, Process_B may have been assigned a higher priority than Process_A, Process_B may have an earlier deadline than Process_A, or Process_B may already be using some other resource, such that allowing it to be blocked by Process_A could lead to a deadlock. One possible scheme requires each requesting process, when it issues a request to add a requested process to the system, to declare a schedule for the requested process, in terms of the number of times per second it must be allowed to run its interval the percentage of CPU time it requires each interval (its utilization), and the resources it requires during the interval. If, in response to each request to add a requested process to the system, the TM determines that it cannot meet the declared schedule and still continue to meet the requirements of all existing processes, it must refuse to start the requested process; but the requesting process may reissue the request with a different schedule. In other words, before a requested process can be added to the set of available processes, the TM must determine that it can meet their combined utilization and resource requirements, as well as guarantee that their scheduling intervals or deadlines will be met. In general, however, the TM may still have to preempt a process with a longer interval (say, a Process_C) to guarantee that a process with a shorter interval (say, a Process_D) meets its deadlines. If, for example, Process_C and Process_D both require the same resource R, then Process_D may preempt Process_C's use of R any time it preempts Process_C.

While R is processing Process_B's request, Process_A again reads R (the second instant of "A_Read_R"), and, in response, R returns it's then-current status (the second instant of "Status_R"). This time Process_A determines that R is no longer processing it's request, but is instead processing Process_B's request. In response, Process_A initiates an exception handler to determine what action is appropriate under the specific circumstances. For example, the exception handler may decide to simply initiate another request for R to OS 16. Alternatively, the exception handler may decide to retrieve from storage the most-recent watchpoint (i.e., the first instant of "Status_R"), and to forward a pointer to this information to OS 16, together with a request to have R resume processing from the point at which the watchpoint was taken.

In an alternate embodiment of my invention, R can, at the option of the particular requesting task to which R is then-currently allocated, periodically save the watchpoint to a storage area uniquely assigned to that requesting task, with each subsequent watchpoint overwriting the previous watchpoint. In the event that a interruption occurs, the requesting task has only to request resumption (rather than reinitiation), and R will be able to unambiguously find and load the appropriate watchpoint. However, in order to minimize system overhead, each requesting task should request watchpoint saves only if and when necessary and appropriate under the circumstances.

In accordance with my invention, a task management system is provided in which: a first task may be preempted by a second task, including its use of a resource; each preemption of a use of a resource can be detected at the precise point of such preemption; a task's use of a resource can be precisely tracked, including any preemption of such use; and a task can be timely notified that a use of a resource has been preempted. As a result, it is no longer essential that the TM save or restore resource context during a task switch; instead, each task assumes responsibility for performing this function as appropriate. Further, each requesting task can include an exception handler specially adapted to deal with the unique requirements and nature of that task, taking into account the relevant task and resource preemption information maintained by, and available from, the TM. As a result of having each requesting task assume responsibility for deciding how to proceed in the event a requested task must be interrupted, the OS can be significantly simplified, and thus made more efficient in operation.

Those skilled in the art will recognize that other modifications and variations can be made without departing from the spirit of my invention. Therefore, I intend that my invention encompass all such variations and modifications as fall within the scope of the appended claims.

What I claim is:

1. In a multi-tasking data processing system in which a first task may request performance of a shared task, a task management method comprising the steps of:

initiating performance of said first task;

in response to a first request from the first task, initiating performance of said shared task for said first task;

interrupting performance of said shared task for said first task;

in response to a second request from the first task:
        reinitiating performance of said shared task for said first task, if said second request requests such reinitiation; but
        resuming performance of said shared task for said first task at a selected point of resumption of operation, if said second request requests such resumption;

completing performance of said shared task for said first task; and completing performance said first task.

2. The method of claim 1 further comprising the step of:

storing at least one watchpoint of said shared task, said watchpoint comprising sufficient information to resume performance of said shared task from a respective point of operation;

wherein, if said second request requests resumption of said shared task, said second request selects said watchpoint as said point of resumption of operation.

3. The method of claim 2 wherein the step of storing is further characterized as:

selectively storing at least one watchpoint of said shared task, said watchpoint comprising sufficient information to resume performance of said shared task from a respective point of operation.

4. The method of claim 3 wherein the first task cooperates with the shared task in the selective storing of said watchpoint.

5. A task management method comprising the steps of:

initiating performance of a first task;

in response to a first request from the first task, initiating performance of a shared task for said first task;

interrupting performance of said shared task for said first task;

in response to a second request from the first task:
   reinitiating performance of said shared task for said first task, if said second request requests such reinitiation; but
   resuming performance of said shared task for said first task at a selected point of resumption of operation, if said second request requests such resumption;

completing performance of said shared task for said first task; and completing performance said first task.

6. The method of claim 5 further comprising the step of:

storing at least one watchpoint of said shared task, said watchpoint comprising sufficient information to resume performance of said shared task from a respective point of operation;

wherein, if said second request requests resumption of said shared task, said second request selects said watchpoint as said point of resumption of operation.

7. The method of claim 6 wherein the step of storing is further characterized as:

selectively storing at least one watchpoint of said shared task, said watchpoint comprising sufficient information to resume performance of said shared task from a respective point of operation.

8. The method of claim 7 wherein the first task cooperates with the shared task in the selective storing of said watchpoint.

9. In a multi-tasking operating system in which a first task may request performance of a shared task, a task management method comprising the steps of:

initiating performance of said first task;

in response to a first request from the first task, initiating performance of said shared task for said first task;

interrupting performance of said shared task for said first task;

in response to a second request from the first task:
   reinitiating performance of said shared task for said first task, if said second request requests such reinitiation; but
   resuming performance of said shared task for said first task at a selected point of resumption of operation, if said second request requests such resumption;

completing performance of said shared task for said first task; and completing performance said first task.

10. The method of claim 9 further comprising the step of:

storing at least one watchpoint of said shared task, said watchpoint comprising sufficient information to resume performance of said shared task from a respective point of operation;

wherein, if said second request requests resumption of said shared task, said second request selects said watchpoint as said point of resumption of operation.

11. The method of claim 10 wherein the step of storing is further characterized as:

selectively storing at least one watchpoint of said shared task, said watchpoint comprising sufficient information to resume performance of said shared task from a respective point of operation.

12. The method of claim 11 wherein the first task cooperates with the shared task in the selective storing of said watchpoint.

\* \* \* \* \*